US010058835B2

(12) United States Patent
Joudrey

(10) Patent No.: US 10,058,835 B2
(45) Date of Patent: Aug. 28, 2018

(54) GRADIENT SYSTEMS AND METHODS

(75) Inventor: Kurt Joudrey, Chelmsford, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 334 days.

(21) Appl. No.: 13/977,777

(22) PCT Filed: Jan. 12, 2012

(86) PCT No.: PCT/US2012/021019

§ 371 (c)(1),
(2), (4) Date: Aug. 29, 2013

(87) PCT Pub. No.: WO2012/099763

PCT Pub. Date: Jul. 26, 2012

(65) Prior Publication Data

US 2013/0330209 A1 Dec. 12, 2013

Related U.S. Application Data

(60) Provisional application No. 61/434,168, filed on Jan. 19, 2011.

(51) Int. Cl.
*B01F 15/04* (2006.01)
*F04B 49/12* (2006.01)
(Continued)

(52) U.S. Cl.
CPC ............ *B01F 15/04* (2013.01); *B01F 15/042* (2013.01); *B01F 15/0404* (2013.01);
(Continued)

(58) Field of Classification Search
CPC ......... F04B 17/03–17/044; F04B 53/16; F04B 23/02; F04B 23/06; F04B 41/06;
(Continued)

(56) References Cited

U.S. PATENT DOCUMENTS 3,932,067 A * 1/1976 Ball et al. ..................... 417/339
3,934,456 A * 1/1976 Munk .......................... 73/61.55
(Continued)

FOREIGN PATENT DOCUMENTS

JP 50151596 A 12/1975

OTHER PUBLICATIONS

International Search Report in related international patent application No. PCT/US2012/021019, dated May 10, 2012; 2 pages.
(Continued)

*Primary Examiner* — Alexander Comley
(74) *Attorney, Agent, or Firm* — Schmeiser, Olsen & Watts LLP

(57) ABSTRACT

Described are a gradient system and method, wherein at least two fluids are mixed in accordance with a noise level threshold. An inlet receives the fluids. A pump head body has a mixing chamber therein in communication with the inlet. The mixing chamber has a first delay volume configured to mix the fluids having a noise level. A pump head extension has a mixing chamber extension therein extending from the mixing chamber. The mixing chamber extension increases the volume of the mixing chamber by a second delay volume to a third delay volume. The fluids are mixed in the third delay volume at a compositional noise level that is less than the noise level.

19 Claims, 9 Drawing Sheets

(51) Int. Cl.
*F04B 53/16* (2006.01)
*F04B 53/00* (2006.01)
*F04B 53/22* (2006.01)

(52) U.S. Cl.
CPC .............. *F04B 49/12* (2013.01); *F04B 53/16* (2013.01); *F04B 53/162* (2013.01); *F04B 53/001* (2013.01); *F04B 53/22* (2013.01)

(58) Field of Classification Search
CPC ........ F04B 7/0266; F04B 15/02; F04B 49/12; B01F 15/0404; B01F 15/042; B01D 15/22
USPC ..... 210/198.2; 417/559, 254, 539, 415, 416, 417/417, 458, 498, 557
See application file for complete search history.

(56) References Cited

U.S. PATENT DOCUMENTS

| | | | | | |
|---|---|---|---|---|---|
| 3,985,019 | A | * | 10/1976 | Boehme et al. | 73/61.56 |
| 4,045,343 | A | * | 8/1977 | Achener et al. | 210/101 |
| 4,260,342 | A | * | 4/1981 | Leka | F04B 1/02 417/458 |
| 4,347,131 | A | * | 8/1982 | Brownlee | 210/101 |
| 4,734,187 | A | * | 3/1988 | Visentin et al. | 210/101 |
| 4,753,581 | A | * | 6/1988 | Hiscock | 417/539 |
| 4,902,414 | A | * | 2/1990 | James | G01N 30/34 210/198.2 |
| 5,108,264 | A | * | 4/1992 | Abdel-Rahman | 417/20 |
| 5,641,270 | A | * | 6/1997 | Sgourakes | F04B 17/04 417/322 |
| 6,048,496 | A | * | 4/2000 | Zhou et al. | 422/70 |
| 7,850,844 | B2 | * | 12/2010 | Kaji et al. | 210/198.2 |
| 2003/0156952 | A1 | * | 8/2003 | Couillard | F04B 11/0075 417/297 |
| 2003/0219343 | A1 | | 11/2003 | Berger et al. | |
| 2004/0136833 | A1 | * | 7/2004 | Allington et al. | 417/44.1 |
| 2005/0084386 | A1 | * | 4/2005 | Mori et al. | 417/199.1 |
| 2005/0129539 | A1 | | 6/2005 | Kudo et al. | |
| 2005/0232792 | A1 | | 10/2005 | Gyger | |
| 2006/0076482 | A1 | * | 4/2006 | Hobbs et al. | 250/287 |
| 2007/0034557 | A1 | | 2/2007 | Ito | |
| 2010/0083739 | A1 | * | 4/2010 | Weissgerber | G01N 30/36 73/61.56 |

OTHER PUBLICATIONS

Extended European Search Report in European Patent Application No. 12737081.5, dated Dec. 19, 2017; 7 pages.

* cited by examiner

GRADIENT SYSTEMS AND METHODS

RELATED APPLICATIONS

This application is a utility application claiming priority to U.S. Provisional Application Ser. No. 61/434,168 filed on Jan. 19, 2011, entitled "Gradient Systems and Methods," the entirety of which is incorporated by reference herein.

FIELD OF THE INVENTION

The present inventive concepts relate generally to liquid chromatography, and more particularly, to gradient systems and methods for reducing compositional noise.

BACKGROUND

Gradient systems are well-known for delivering a controlled mixture of two or more solvents to a liquid chromatography system.

There are two common types of gradient systems used with liquid chromatography systems. The first type is a high-pressure gradient system, which comprises two pumps operating in parallel, each pumping a solvent into a mixer at a high pressure, wherein the mixer delivers the solvent mixture to a column of a high-performance liquid chromatography (HPLC) system.

The second type is a low-pressure gradient system, which comprises a gradient proportioning valve (GPV) that mixes two or more solvents together at low pressure and outputs the resulting mixture to a single pump, which in turn delivers the solvent mixture to a sample of an HPLC system.

The GPV, however, may not provide sufficient mixing. Moreover, the volume between the GPV and the pump outlet is insufficient for mixing solvents, which can lead to compositional noise, referred to as mixing noise.

A conventional approach for reducing compositional noise is to couple a large-volume mixer to the output of the pump. However, the mixer adds undesirable delay volume to the system, which can affect the delivery of accurate and reproducible gradients as well as have a possible negative impact on cycle time for an HPLC, ultra-performance liquid chromatography (UPLC), or any liquid chromatography system. Moreover, an additional mixer may be ineffective in adequately reducing mixing noise.

SUMMARY

In accordance with an aspect, provided is a gradient pump head that mixes at least two fluids at or less than a noise level threshold. The gradient pump head comprises an inlet, a pump head body, a pump head extension, and an outlet. The inlet receives the at least two fluids. The pump head body has a mixing chamber therein that is in communication with the inlet. The pump head extension has a mixing chamber therein that has a first delay volume configured to mix the at least two fluids at a noise level. The mixing chamber extension extends from the mixing chamber. The mixing chamber extension increases the volume of the mixing chamber by a second delay volume to a third delay volume. The at least two fluids are mixed in the third delay volume having a compositional noise level that is less than the noise level.

In accordance with another aspect, provided a gradient system that mixes at least two fluids. The gradient system comprises a pumping actuator and a pump head. The pump head is coupled to the pumping actuator. The pump head comprises a pump head body, a mixing chamber in the pump head body, a pump head extension, and a mixing chamber extension in the pump head extension. The mixing chamber has a first volume. The pump head extension extends from the pump head body. The mixing chamber extension is in fluid communication with the mixing chamber. The mixing chamber extension increases the volume of the mixing chamber by a second delay volume to a third delay volume. The at least two fluids are mixed in the third volume having a compositional noise level that is less than a noise level of the first volume of the mixing chamber.

In accordance with another aspect, provided is a gradient system that mixes at least two fluids. The gradient system comprises a pumping actuator and a pump head coupled to the pumping actuator. The pump head comprises a pump head body and a mixing chamber in the pump head body. The gradient system further comprises a piston controlled by the pumping actuator, the piston extending through at least a portion of the mixing chamber. The gradient system further comprises a controller that moves the piston to a starting location in the mixing chamber. The mixing chamber has an adjustable stroke length that determines the delay volume according to the starting location of the piston plunger in the mixing chamber. The at least two fluids are mixed in the determined volume at a compositional noise level that is less than a noise level of the first volume of the mixing chamber.

In accordance with another aspect, a method is featured for mixing at least two fluids. In the method, a mixing chamber is provided in the gradient system. The mixing chamber has a first delay volume configured to mix the at least two fluids having a noise level. The mixing chamber is tuned to have a second delay volume. The at least two fluids are mixed in the second delay volume having a compositional noise level of a mixture of the at least two fluids that is less than the noise level.

BRIEF DESCRIPTION OF THE DRAWINGS

The above and further advantages of the inventive concepts may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, a gradient system and method for reducing compositional noise are described. The gradient system includes a mixing chamber that receives two or more solvents, and is configured, or tuned, to mix the solvents in accordance with compositional noise threshold requirements. In particular, the delay volume of the mixing chamber can be configured to determine a peak-to-peak compositional noise level.

A pump head of the gradient system can be configured according to several different approaches. In one approach, a mixing chamber extension can be coupled to the mixing chamber to increase the total delay volume of the mixing chamber. The mixing chamber extension can also be formed by increasing the dimensions of the mixing chamber, for example, length or diameter, thereby increasing the delay volume of the mixing chamber according to predetermined noise level requirements. For example, a noise level during mixing of two solvents in the combined delay volume of the mixing chamber and the mixing chamber extension is less than a noise level produced if the solvents are mixed in the mixing chamber alone.

In another approach, a pump head can be constructed to receive a piston and plunger extending from an actuator coupled to the pump head. The location of the plunger can be controlled by a control system to determine the effective delay volume of the mixing chamber. More specifically, a stroke length of the piston and plunger can be adjusted so that the delay volume is likewise adjusted to reduce compositional noise that may occur during mixing of solvents.

Although described herein refers primarily to aspects including low-pressure gradient systems, aspects apply also to high-pressure gradient systems. Embodiments described herein frequently include HPLC systems; however, other embodiments can refer to different liquid chromatography systems, for example, UPLC systems.

Figure 1:
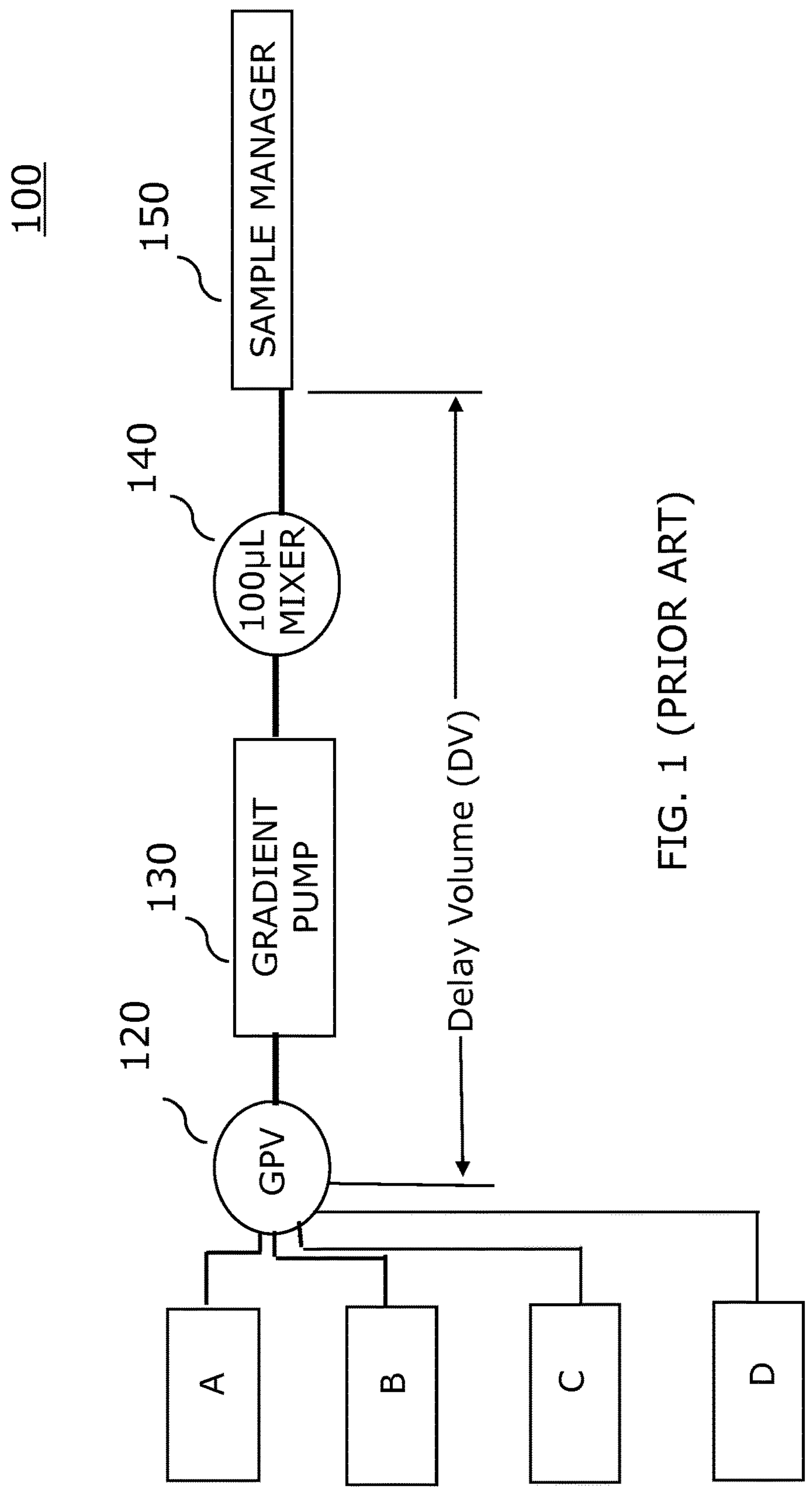
FIG. 1 (PRIOR ART)
FIG. 1 is a block diagram of a conventional low-pressure gradient system.

FIG. 1 is a block diagram a conventional low-pressure gradient system 100. The gradient system 100 includes a gradient proportioning valve (GPV) 120 that mixes two or more solvents A-D together, and outputs the mixture of solvents A-D to a gradient pump 130. The gradient pump 130 performs additional mixing of the solvents A-D, and precisely controls the flow of the mixture of solvents A-D to a sample manager 150 for introduction to a sample.

The gradient system 100 further includes a mixer 140 coupled to the output of the gradient pump 130 to perform additional mixing of the solvents A-D in order to reduce mixing noise. A typical mixer size is 100 μL. However, the location and size of the mixer 140 can be counterproductive with regard to reducing noise in an HPLC system. For example, a 100 μL mixer may be excessively large, resulting in unnecessary delay volume.

Figure 2:
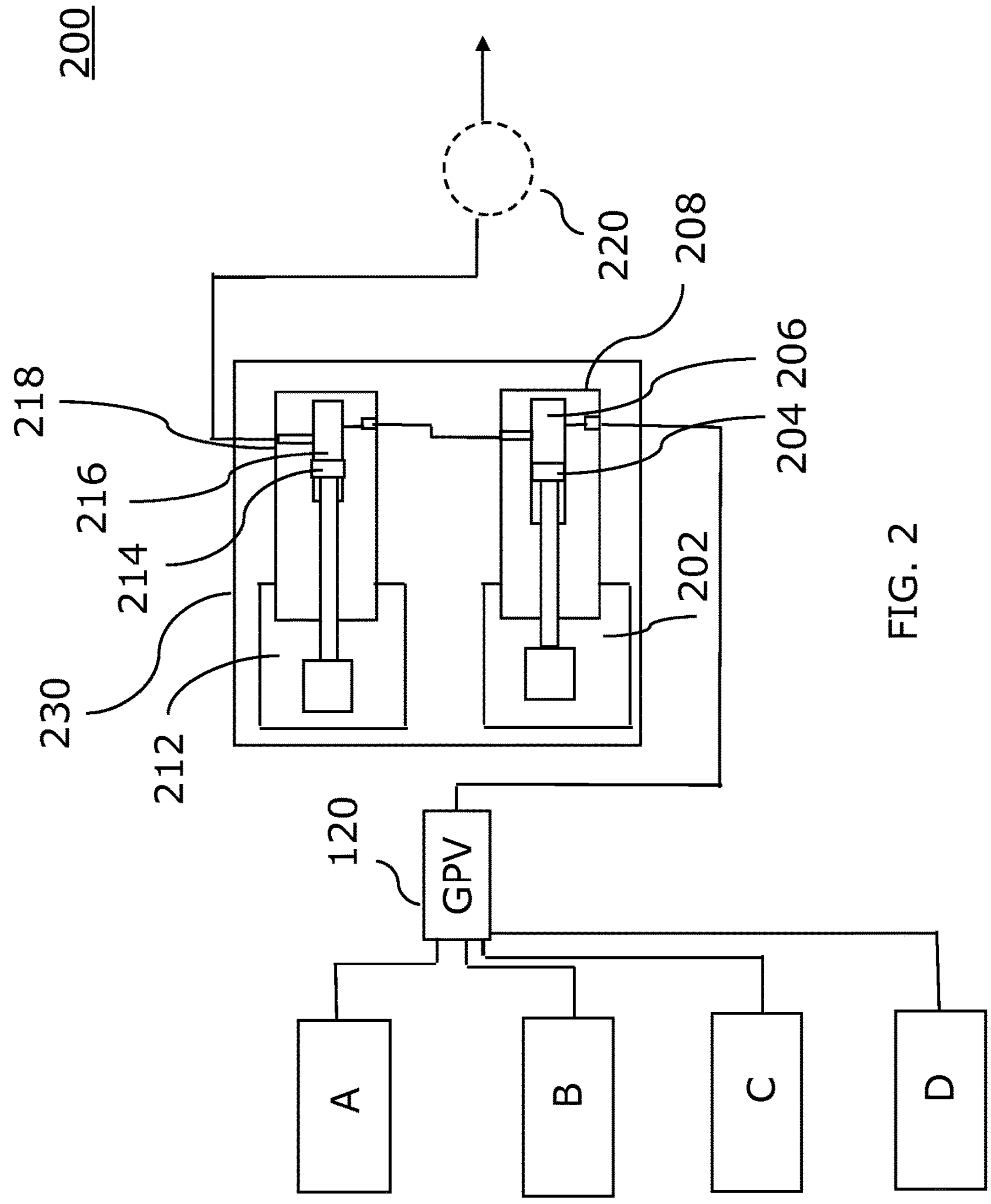
FIG. 2 is a block diagram of an embodiment of a gradient system.

FIG. 2 is a block diagram of an embodiment of a gradient system 200, in accordance with aspects of the present inventive concepts.

The gradient system 200 includes a gradient pump 230. The gradient pump 230 comprises a primary pump actuator 202 and an accumulator actuator 212. The gradient pump 230 further comprises a primary pump head 208 coupled to the primary pump actuator 202, and an accumulator pump head 218 coupled to the accumulator actuator 212.

The primary pump head 208 includes a primary mixing chamber 206 and a piston plunger 204 positioned in the primary mixing chamber 206. The accumulator pump head 218 includes an accumulator mixing chamber 216 and a piston plunger 214 positioned in the accumulator mixing chamber 216.

The primary pump actuator 202 and accumulator actuator 212 are constructed and arranged to operate together to receive a mixture of solvents A-D from a GPV 120 and to deliver accurate and reproducible gradients to a sample manager. In doing so, the primary pump actuator 202 and accumulator actuator 212 can have the same or similar configurations, or have different configurations. In other embodiments, the primary pump head 208 and the accumulator pump head 218 can have the same configurations, or have different configurations. For example, the accumulator mixing chamber 216 of the accumulator pump head 218 can be configured to have a volume that is less than a volume of the primary mixing chamber 206 of the primary pump head 208. In another example, the primary pump actuator 202 and/or primary pump head 208 can be constructed to provide a predetermined compression ratio across various pump head configurations, for example, configurations related to mixing chamber volume or piston stroke length as described herein.

The gradient system 200 can further include an optional mixer 220 coupled to the output of the gradient pump 230, which can perform additional mixing of the solvents A-D.

During operation, the GPV 120 outputs a mixture of solvents A-D to the gradient pump 230, more specifically to the primary mixing chamber 206 of the primary pump head 208, where the solvents A-D are additionally mixed. The mixture of solvents A-D are then output to the accumulator mixing chamber 216 of the accumulator pump head 218 for further mixing.

In accordance with the present invention, the gradient pump 230 can be constructed and arranged to reduce compositional noise by tuning the mixing chamber volume in the primary pump head 208 and/or the accumulator pump head 218. A pump head extension having a mixing chamber extension can be attached to a pump head body, thereby increasing the volume of the mixing chamber in the pump head body. Alternatively, a pump head body can be constructed to include both a mixing chamber extension and the mixing chamber. Alternatively, a pump head body can receive a plunger that determines the delay volume of the mixing chamber by being positioned along the length of the mixing chamber as determined by a control system.

Figures 3A, 3B:
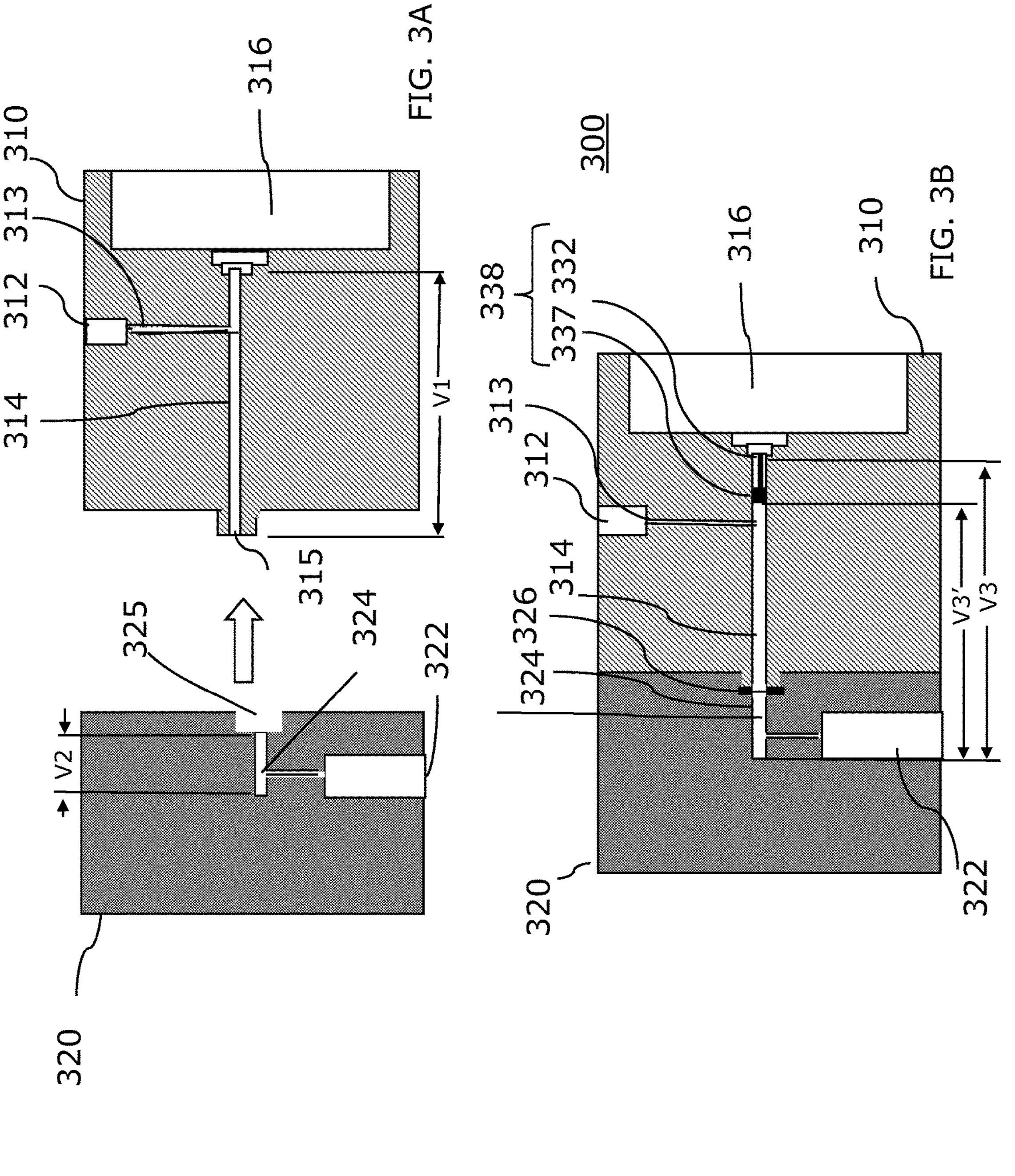
FIG. 3A is a close-up illustrative view of an embodiment of an unassembled gradient pump head.
FIG. 3B is an illustrative view of the gradient pump head of FIG. 3A constructed to reduce compositional noise in a gradient system.

FIG. 3A is an close-up illustrative view of an embodiment of a gradient pump head comprising a body 310 and a head extension 320. FIG. 3B is a close-up illustrative view of the gradient pump head 300 of FIG. 3A, wherein the body 310 and the head extension 320 are attached to each other. The gradient pump head 300 when assembled as described with reference to FIG. 3B can be part of a gradient system, for example, the low-pressure gradient system 200 described with reference to FIG. 2. In a preferred embodiment, the gradient pump head 300 is coupled to an accumulator actuator, for example, accumulator actuator 212 described with reference to FIG. 2. In another embodiment, the gradient pump head 300 is coupled to a primary pump actuator, for example, primary pump actuator 202 described with reference to FIG. 2. In other embodiments, the gradient pump head 300 is part of a high-pressure gradient system.

The body 310 of the gradient pump head 300 comprises a mixing chamber 314. A bore extends through at least a portion of the body 310 to form the mixing chamber 314. The body 310 can further comprise a fluid tight seal 316 attached to the body 310 at one end of the mixing chamber

314. The mixing chamber 314 is enclosed by the seal 316 at one side of the mixing chamber 314 and the head extension 320 at the other side of the mixing chamber 314.

The mixing chamber 314 receives a mixture of two or more solvents, referred to herein as solvents A-D via an inlet 322. The mixing chamber 314 is configured to mix the solvents A-D in the mixing chamber 314 at a predetermined compositional noise threshold determined by the volume V1 of the mixing chamber 314.

The body 310 further comprises an outlet 312 in communication with the mixing chamber 314 by a fluid path 313 between the outlet 312 and the mixing chamber 314. The outlet 312 outputs the mixture of solvents A-D to a sample manager, which in turn introduces the mixture of solvents A-D to a sample for output to an external analysis system, for example, to a solvent manager or capillary column of an HPLC system.

The head extension 320 comprises a mixing chamber extension 324 that extends from one side of the head extension 320 through at least a portion of the head extension 320. An interface may be formed by a protrusion 315 or the like extending from the body 310 and a mating opening 325 or the like of the mixing chamber extension 324. The mixing chamber extension 324 is attached to the mixing chamber 314 by a fluid-tight coupler 326 at the interface between the head extension 320 and the body 310. In an embodiment, the coupler 326 is a sealant that provides a fluid-tight seal between the mixing chamber extension 324 and the mixing chamber 314. The fluid-tight seal can be a high-pressure seal such as a high-pressure face seal.

The mixing chamber extension 324 is attached to the mixing chamber 314 to accommodate user-specified noise threshold requirements that can be achieved by sufficient mixing in the gradient pump 230. These requirements may vary due to factors such as the type of solvents in the mixture, solvent composition, sensitivity to delay volume, turbulence thresholds, frequency levels, compression ratio, cycle time, or other factors. Accordingly, mixing chamber extensions having different volumes can be provided. For example, if a larger mixing chamber volume is required, a mixing chamber extension can be replaced with a larger mixing chamber extension.

It is preferred, but not required, that the mixing chamber extension 324 and the mixing chamber 314 have the same or similar cross-sectional dimensions, for example, a uniform circumference along the length of the gradient pump head.

The gradient pump head 300 comprises a piston 338 that includes a plunger 337 coupled to one end of a shaft 332. The other end of the shaft 332 is coupled to an actuator, for example, accumulator actuator 212 described with reference to FIG. 2, which moves the shaft 332 and plunger 337 along the length of the mixing chamber 314 and mixing chamber extension 324.

The mixing chamber extension 324 when coupled to the mixing chamber 314 increases the volume V1 of the mixing chamber 314 by a volume V2 of the mixing chamber extension 324, for a total mixing chamber volume V3. The mixing chamber volume V3 can receive at least two solvents, for example, solvents A and B, which are mixed in the mixing chamber volume V3 of the mixing chamber 314 and mixing chamber extension 324 at a noise level that is less than a compositional noise threshold corresponding to the first volume V1 of the mixing chamber 314 alone. The solvents A-D can be received as a mixture, which is further mixed in the mixing chamber volume V3.

In an embodiment, the inlet 322 is positioned in the head extension 320 and is in communication with the mixing chamber extension 324 such that the solvents A-D are delivered from the inlet 322 to the mixing chamber extension 324. In another embodiment, an inlet 322 is positioned in the body 310, and is in communication with the mixing chamber 314.

In a preferred embodiment, the inlet 322 receives a mixture of solvents A-D, from a primary pump head coupled to a primary pump actuator, for example, an outlet of the primary pump head 208 described with reference to FIG. 2, when the gradient pump head 300 is coupled to the accumulator actuator 212. In another embodiment, the inlet 322 of the gradient pump head 300 receives a mixture of solvents A-D from a GPV, for example, GPV 120 described with reference to FIG. 2, when the gradient pump head 300 is coupled to a primary pump actuator.

During a forward stroke in a dispensing operation, the shaft 332 and plunger 337 of the piston 338 move in a forward direction to output the mixture of solvents A-D. Here, the mixing chamber volume V3 is reduced by the forward motion of the plunger 337, for example, to mixing chamber volume V3', and a force is applied in a controlled manner to the mixture of solvents A-D in the volume V3' of the pump head 300. During a backstroke of the piston 338, the mixing chamber volume is increased by the reverse motion of the plunger 337, wherein the mixing chamber 314 and mixing chamber extension 324 intake the solvents A-D via the inlet 322.

Figure 4:
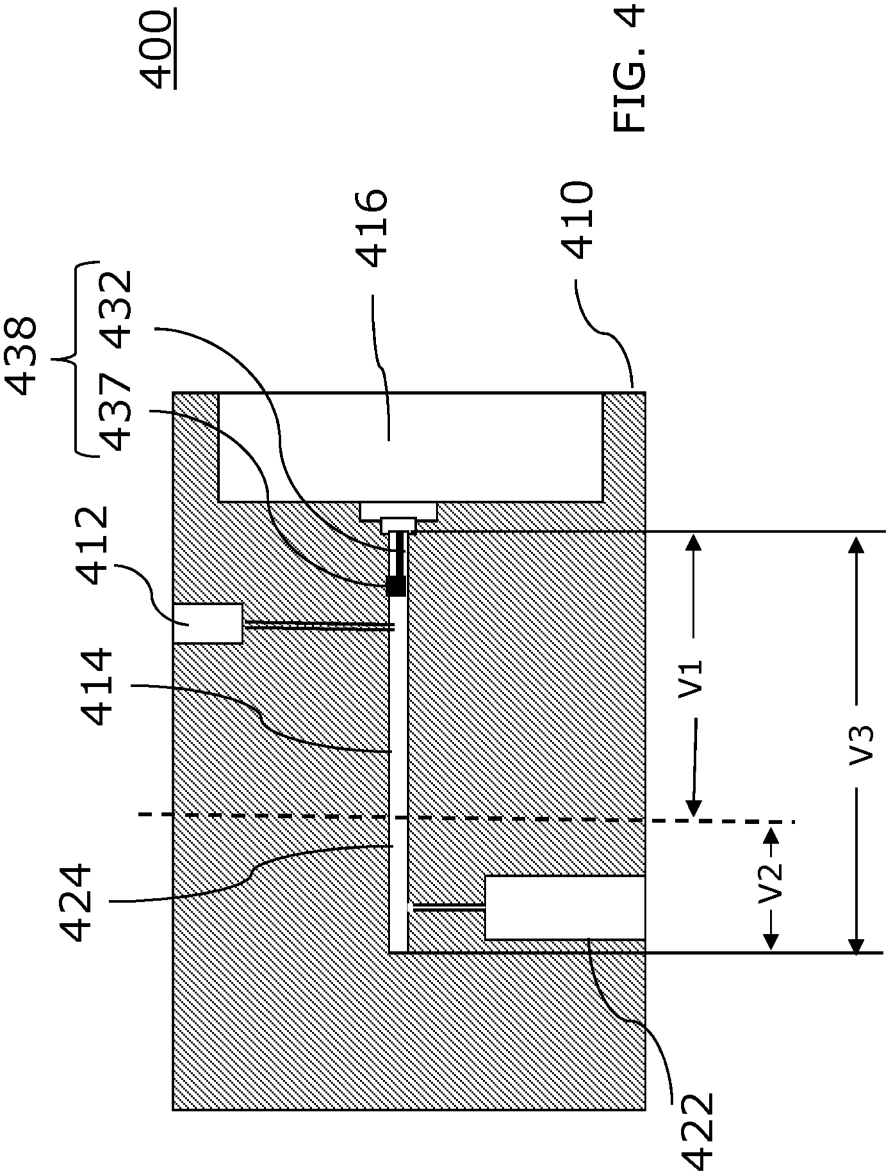
FIG. 4 is an illustrative view of another embodiment of a gradient pump head.

FIG. 4 is an illustrative view of another embodiment of a gradient pump head 400.

The gradient pump head 400 comprises a mixing chamber 414, a mixing chamber extension 424, an inlet 422, and an outlet 412. The gradient pump head 400 can include a body 410 formed from a single stock of material known to those of ordinary skill in the art, which is molded or machined to form the mixing chamber 414, mixing chamber extension 424, inlet 422, and outlet 412. In another embodiment, the gradient pump head 400 is formed from two different stocks of material, each of which is molded or machined to form the mixing chamber 414 and mixing chamber extension 424, respectively. In this embodiment, the inlet 422 and outlet 412 can be formed in either the mixing chamber 414 or the mixing chamber extension 424.

The mixing chamber 414 has a first volume V1. The mixing chamber extension 424 adds a volume V2 to the volume V1 of the mixing chamber 414, for a total mixing chamber volume V3.

The mixing chamber 414 can receive at least two solvents, for example, solvents A and B shown in FIG. 2, which are mixed in the mixing chamber volume V3 of the mixing chamber 414 and mixing chamber extension 424 at a mixing noise level that is less than a compositional noise threshold corresponding to the first volume V1 of the mixing chamber 414 alone.

The gradient pump 400 comprises a piston 438 that includes a shaft 432 extending through a bore 433 in the gradient pump head 400 and is coupled to a plunger 437. The plunger 437 and shaft 432 of the piston 438 described with reference to FIG. 4 operate in a similar manner as the plunger 337 and shaft 332 described in FIGS. 3A and 3B.

The gradient pump 400 further comprises a seal 416 similar to the seal 316 described above with regard to FIGS. 3A and 3B.

Figure 5:
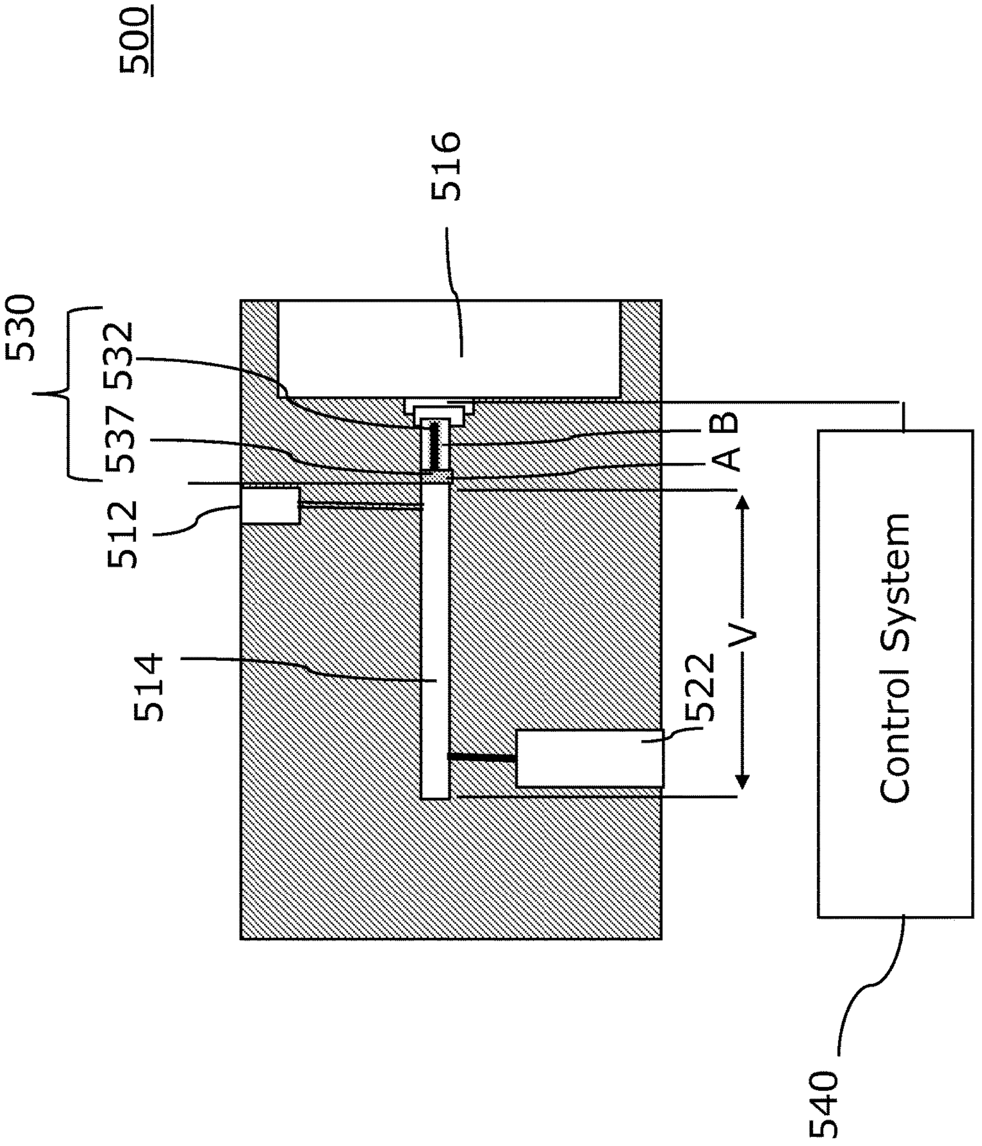
FIG. 5 is an illustrative view of another embodiment of a gradient pump head.

FIG. 5 is an illustrative view of another embodiment of a gradient pump head 500.

The gradient pump head 500 comprises a mixing chamber 514, an inlet 522, and an outlet 512 similar to other embodiments described herein; thus, overlapping descriptions thereof will not be repeated.

The gradient pump head 500 further comprises a piston 530 that is controlled by a control system 540. The piston 530 comprises a shaft 532 extending through a mixing chamber 514 in the gradient pump head 500 and coupled to a plunger 537. The control system 540 can further comprise firmware that produces signals to control the movement of the piston 530.

The control system 540 can control the plunger position of one or more gradient pump heads, for example, gradient pump head 300 described in FIGS. 3A and 3B, and gradient pump head 400 described in FIG. 4, in order to maximize mixing performance during operation of the gradient pump head. For example, the plunger position can be adjusted by the control system 540 to accommodate for changes in the volume delivered by the primary to the accumulator of the gradient system.

In another example, a low-pressure gradient system can have a primary pump head and an accumulator pump head each having the same mixing chamber dimensions, such as length, volume, circumference, and the like. The control system 540 can change the effective delay volume of the mixing chamber of at least one of the primary pump head and the accumulator pump head to be smaller than the maximum volume of the mixing chamber in order address requirements related to system pressure, flow rate, mixture composition, compression ratio, or other related requirements.

The control system 540 can control the movement of the plunger 537 to be at any location along the length of the mixing chamber 514, for example, at a starting position A. A mixing chamber volume V, i.e., the volume between the starting position A of the plunger 537 in the mixing chamber 514 and a seal 516 at the end of the mixing chamber 514, can be adjusted in response to control signals provided by the control system 540. This feature permits a gradient system to address compositional noise threshold requirements, which can vary due to fluctuations in solvent type, solvent concentration, flow rate, compression ratio, or factors known to those of ordinary skill as contributing to compositional noise.

During a forward stroke of the piston 530, the plunger 537 can move along the length of the volume V to discharge a mixture of solvents from the mixing chamber 514 via the outlet 512. During a backstroke of the piston 530, the plunger 537 cannot move beyond the predetermined starting location A, for example, to a location B, unless the control system 540 is programmed to define location B as the starting location of the plunger 537. The control system 540 can also be programmed to define an end location of the plunger 537, for example, a location along the mixing chamber 514 where a maximum forward stroke of the plunger 537 of the piston 530 can be positioned.

Another feature is that the position of the piston 530 can be changed dynamically based on pressure, flow, material type, or other factors. For example, the control system 540 can be in communication with one or more transducers (not shown) that can measure pressure, fluid volume changes, temperature, and/or other properties in the mixing chamber 514, and provide signals related to changes in these properties. The control system 540 in turn adjusts the position of the plunger 537 to optimize the volume V according to such changes. For example, a transducer can measure volume to be mixed in the gradient pump head 500 and provide a target operating volume to the control system 540. In response, the control system 540 can determine the optimum mixing chamber volume V that permits the target operating pressure to be maintained.

The pump head 500 can be coupled to an accumulator actuator, a primary pump actuator, or both, which can move the shaft 532 inside the mixing chamber 514 during operation.

Figure 6:
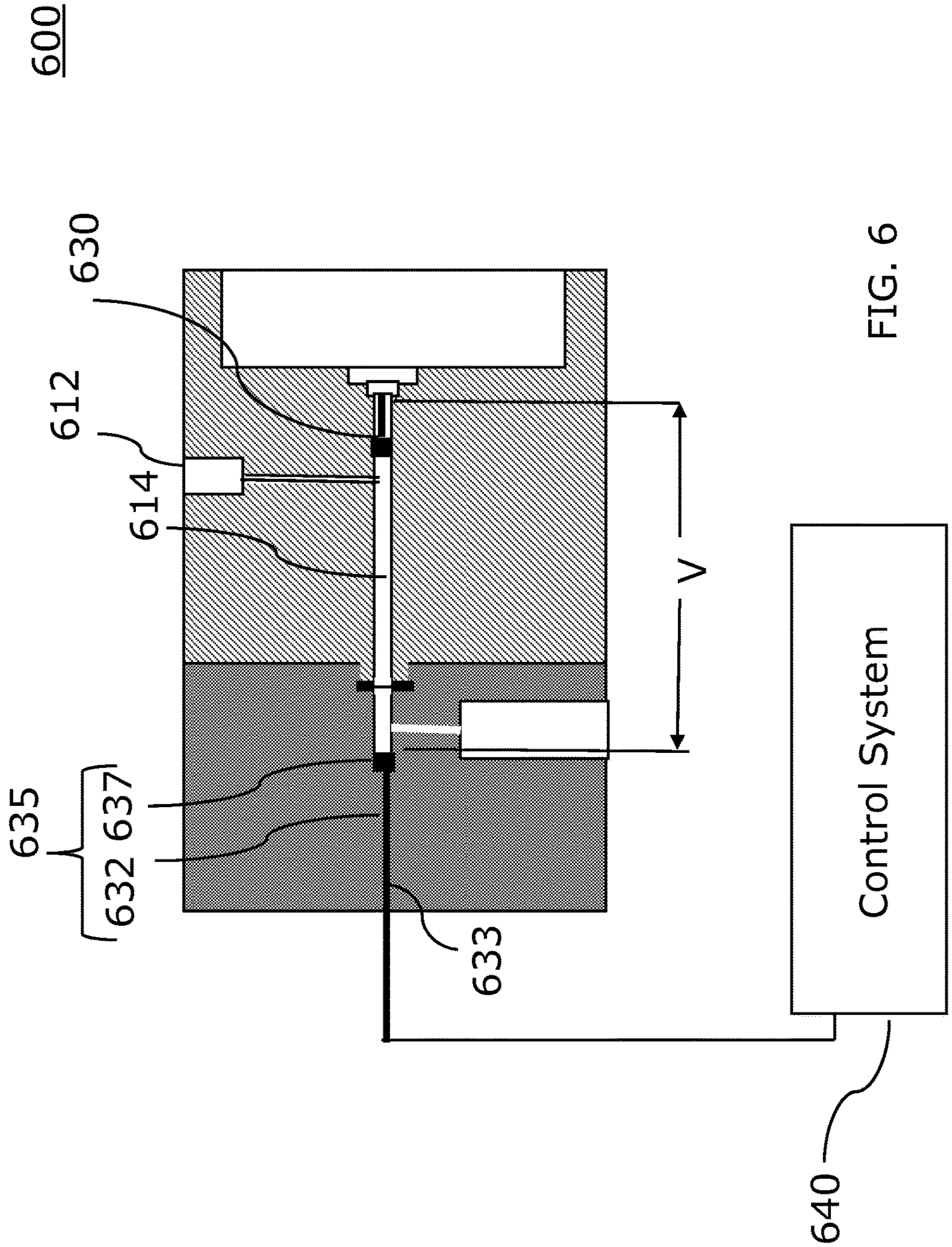
FIG. 6 is an illustrative view of another embodiment of a gradient pump head.

FIG. 6 is an illustrative view of another embodiment of a gradient pump head 600. The gradient pump head 600 includes a first piston 630 and a second piston 635. The first piston 630 is similar to the pistons described above, for example, piston 338 illustrated in FIG. 3B. The second piston 635 includes a plunger 637 coupled to one end of a shaft 632. The other end of the shaft 632 is coupled to an actuator or other apparatus known to those of ordinary skill in the art that moves the shaft 632 and plunger 637 along the length of a mixing chamber 614. The shaft 632 extends through a bore 633 in the gradient pump head 600.

A control system 640 can control the movement of the plunger 637 to be at any location along the length of the mixing chamber 614, similar to the control system 540 described in FIG. 5. However, the plunger 637 can remain stationary during operation in order to define an outermost end of the mixing chamber 614. In this manner, a volume V can be adjusted by an independent piston 635 instead of a piston 630, which moves the fluid received in the mixing chamber 614, for example, outputting fluid from the mixing chamber 614 via an outlet 612.

Figure 7:
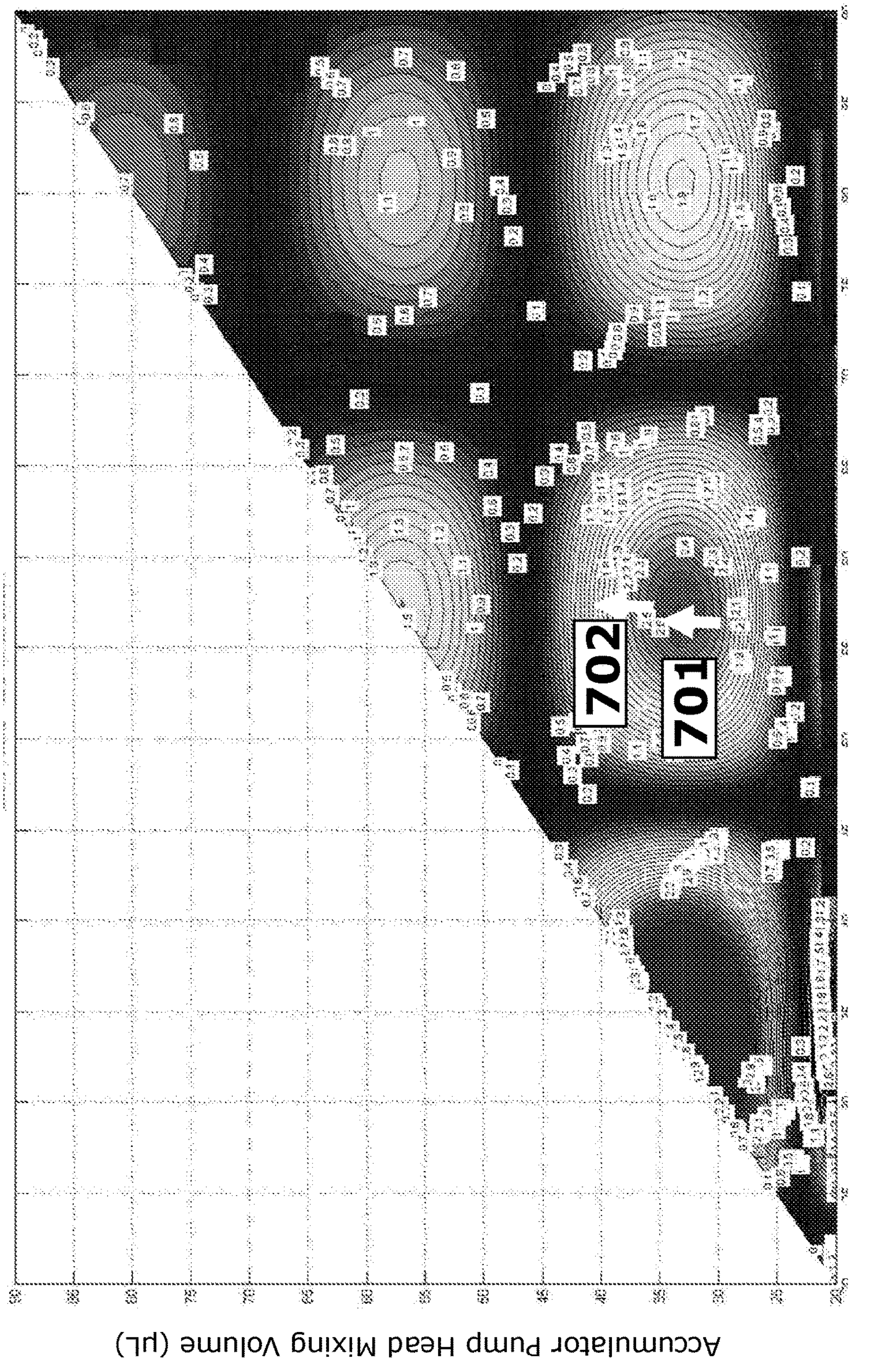
FIG. 7 is a graph illustrating the effects of different delay volumes of a gradient pump on compositional noise.

FIG. 7 is a graph illustrating the effects of different delay volumes of a gradient pump on compositional noise. The x axis of the graph represents a range of primary pump head mixing volumes, and the y axis represents a range of accumulator pump head mixing volumes in a gradient system. Each region in the graph is identified by a set of concentric rings have various contours. Each ring represents a peak-to-peak compositional noise level corresponding to a percentage of a particular solvent in a mixture of solvents. The dark shaded regions between the regions of concentric rings indicate little or no compositional noise. The lightly shaded regions between concentric rings indicate an average peak-to-peak compositional noise level between 1-2% of a solvent in the mixture. The gray regions in the center of the concentric ring regions indicate a high peak-to-peak compositional noise level, or at least 2.5% of a solvent in the mixture.

Thus, at any point in the graph, a peak-to-peak compositional noise level can be determined as a function of accumulator pump head volume and primary pump head volume. For example, for a mixture of a first solvent A and a second solvent B, a primary pump actuator having a mixing volume of 55 ml and an accumulator actuator having a mixing volume of 35 ml produces a peak-to-peak compositional noise of 2.6%.

The graph described with reference to FIG. 7 illustrates that a change in volume in the primary pump head and/or the accumulator pump head can cause compositional noise to increase or decrease, and that an increase in total volume of a pump head does not always result in better mixing performance. This is evident at arrow 701, which shows an increase in noise from 2.1% to 2.6% when the delay volume of the accumulator actuator is increased from 30 ml to 35 ml. On the other hand, arrow 702 shows a decrease in noise from 2.6% to 1.8% when the delay volume of the accumulator actuator is increased from 35 ml to 40 ml. Thus, a pump head can be configured to include a delay volume that minimizes a noise level generated during a mixing operation in the pump head.

Figure 8:
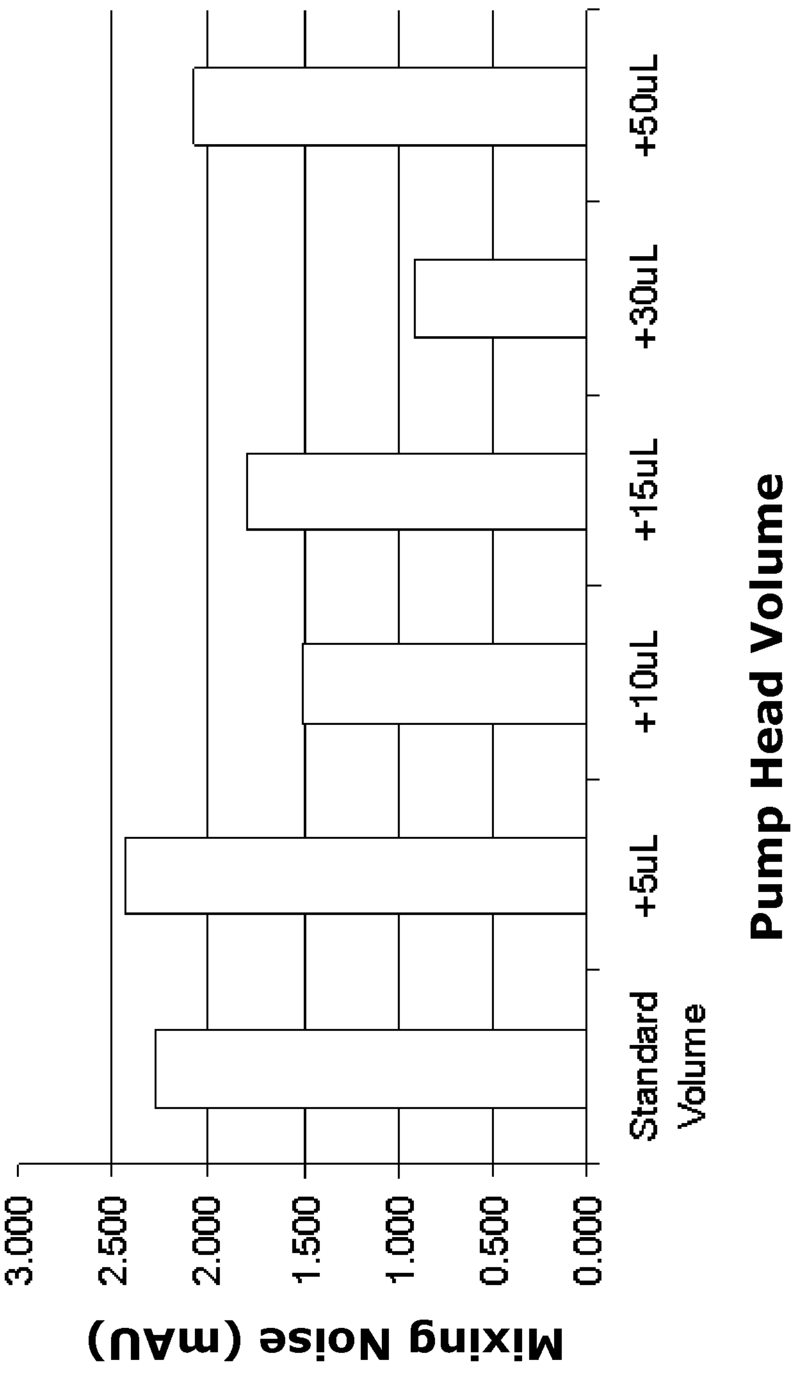
FIG. 8 is a bar graph comparing the effects of delay volumes on compositional noise.

FIG. 8 is a bar graph comparing the effects of delay volumes on compositional noise. In particular, FIG. 8 includes actual data that compares the effects of various delay volumes on trifluoroacetic acid (TFA) noise.

A standard volume of an accumulator head mixing chamber illustrates a corresponding noise level of 2.300 mAU. As the delay volume increases, noise does not necessarily decrease. As shown in FIG. 8, when an additional delay volume of 50 μL is added to the standard volume, for example, by an additional mixer, the compositional noise level increases. A delay volume for a mixing chamber having a reduced compositional noise level can be determined from this graph to be 30 μL greater than the standard volume of the mixing chamber.

Figure 9:
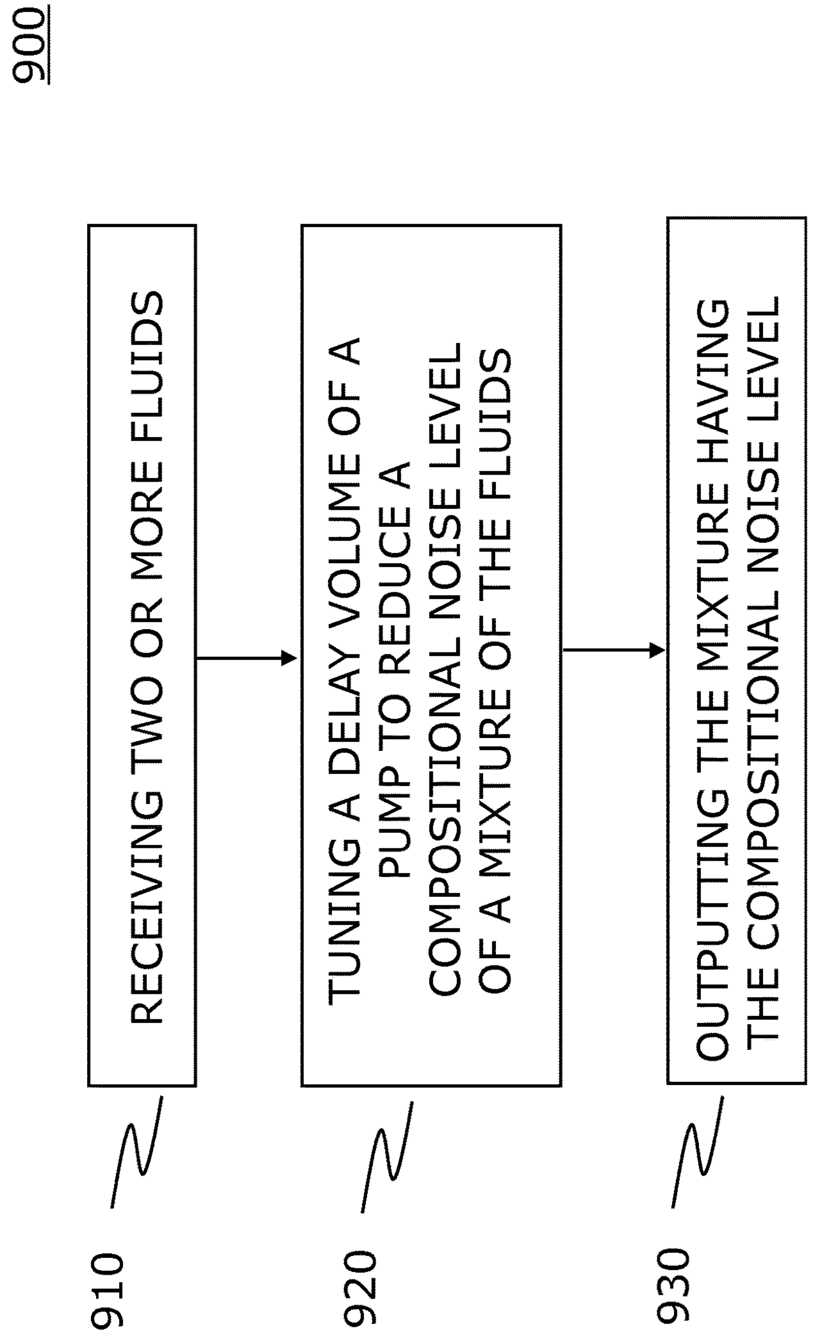
FIG. 9 is a flow diagram of an embodiment of a method for reducing compositional noise in a gradient system.

FIG. 9 is a flow diagram of an embodiment of a method 900 for reducing mixing noise in a gradient system.

According to the method 900, at least two fluids are received (step 910) by a gradient system. A mixing chamber of the gradient system is tuned (step 920) to have a delay volume that reduces a compositional noise level of a mixture of the at least two fluids. The mixing chamber can be tuned by coupling a mixing chamber extension to the mixing chamber, thereby increasing the total delay volume by an amount that reduces the compositional noise level. A mixing chamber can be provided having a tuned diameter, length, or other dimensions that reduces the compositional noise level. The mixing chamber can alternatively have an adjustable stroke length, wherein the delay volume of the mixing chamber is determined by a plunger location in the mixing chamber.

The mixture of the at least two fluids is output (step 930), for example, to a capillary column of an HPLC system having the compositional noise level less than the noise level threshold.

While the invention has been shown and described with reference to specific embodiments, it should be understood by those skilled in the art that various changes in form and detail may be made therein without departing from the spirit and scope of the invention as recited in the accompanying claims.

What is claimed is:

1. A gradient pump head that mixes at least two fluids at or less than a noise level threshold, comprising:

an inlet that receives at least two fluids;

a pump head body having a single mixing chamber therein, the mixing chamber having a first delay volume configured to mix the at least two fluids, wherein a noise level threshold is established that corresponds to the first delay volume;

an outlet formed in the pump head body; and a monolithic pump head extension having a mixing chamber extension formed therein, the mixing chamber extension in communication with the single mixing chamber and the inlet, the mixing chamber and the mixing chamber extension extending along a common longitudinal axis that extends from a region of the mixing chamber extension in communication with the inlet to a region of the mixing chamber in communication with the outlet of the pump head body, the mixing chamber extension increasing the first delay volume of the mixing chamber by a second delay volume to a third delay volume, wherein the at least two fluids are mixed in the third delay volume, and wherein the mixed fluid exhibits a compositional noise level that is less than the noise level threshold for the first delay volume, the monolithic pump head extension having a region at an axis perpendicular to and intersecting the common longitudinal axis, the mixing chamber extension having an outermost end on the common longitudinal axis, and that terminates at the region of the monolithic pump head extension at the axis perpendicular to and intersecting the common longitudinal axis, wherein the inlet is positioned in the pump head extension and extends along an inlet longitudinal axis perpendicular to and intersecting the common longitudinal axis, wherein the outlet extends along an outlet longitudinal axis parallel to the inlet longitudinal axis, wherein the inlet longitudinal axis extending through the pump head extension and the outlet longitudinal axis extending through the pump head body are separated by a length of the mixing chamber and the mixing chamber extension extending along the common longitudinal axis, and wherein the mixing chamber and the mixing chamber extension have a uniform circumference along the length of the mixing chamber and the mixing chamber extension extending along the common longitudinal axis.

2. The gradient pump head of claim 1, wherein the pump head body is removably coupled to the pump head extension.

3. The gradient pump head of claim 2, wherein the pump head further comprises a coupler that provides a fluid-tight seal between the mixing chamber and the mixing chamber extension.

4. The gradient pump head of claim 1, wherein the pump head extension and pump head body are formed from a common stock.

5. The gradient pump head of claim 1, wherein a piston having a plunger is positioned in the mixing chamber and constructed and arranged to move along the common longitudinal axis, and wherein the piston has an adjustable stroke length that changes a volume of the mixing chamber that determines the third delay volume according to the location of the piston plunger in the mixing chamber.

6. The gradient pump head of claim 1, wherein the gradient pump head is at least one of a primary pump head and an accumulator pump head.

7. The gradient pump head of claim 6, wherein the compositional noise level is a function of at least one of a delay volume of the accumulator pump head and a delay volume of the primary pump head.

8. A gradient system that mixes at least two fluids comprising:

a pumping actuator; and a pump head coupled to the pumping actuator, the pump head comprising:

a pump head body;

a single mixing chamber in the pump head body, the mixing chamber having a first volume;

a monolithic pump head extension extending from the pump head body; and a mixing chamber extension in the pump head extension in fluid communication with the single mixing chamber, the mixing chamber extension increasing the first volume of the mixing chamber by a second volume to a third volume, wherein:

at least two fluids are mixed in the third volume;

the mixed fluid exhibits a compositional noise level that is less than a noise level threshold of the first volume of the mixing chamber;

the pump head body and the pump head extension extending along a common longitudinal axis; and the pump head extension having a region that extends along an axis perpendicular to and intersecting the common longitudinal axis, the mixing chamber extension having an outermost end on the common longitudinal axis, and that terminates at the region of the pump head extension extending along the axis perpendicular to and intersecting the common longitudinal axis, the common longitudinal axis extending from a region of the mixing chamber extension in communication with an inlet to a region of the mixing chamber in communication with an outlet formed in the pump head body, wherein the inlet is positioned in the pump head extension and extends along an inlet longitudinal axis perpendicular to and intersecting the common longitudinal axis, wherein the outlet extends along an outlet longitudinal axis parallel to the inlet longitudinal axis, wherein the inlet longitudinal axis and the outlet longitudinal axis are separated by a length of the mixing chamber and the mixing chamber extension extending along the common longitudinal axis, and wherein the mixing chamber and the mixing chamber extension have a uniform circumference along the length of the mixing chamber and the mixing chamber extension extending along the common longitudinal axis.

9. The gradient system of claim 8, wherein the pump head body is removably coupled to the pump head extension.

10. The gradient system of claim 9, wherein the pump head further comprises a coupler that provides a fluid-tight seal between the mixing chamber and the mixing chamber extension.

11. The gradient system of claim 8, wherein the pump head extension and pump head body are formed from a common stock.

12. The gradient system of claim 8, wherein a piston having a plunger is positioned in the mixing chamber and constructed and arranged to move along the common longitudinal axis, and wherein the piston has an adjustable stroke length that changes a volume of the mixing chamber that determines the third volume according to the location of the piston plunger in the mixing chamber.

13. The gradient system of claim 8, wherein the pump head is at least one of a primary pump head and an accumulator pump head.

14. The gradient system of claim 13, wherein the compositional noise level is a function of at least one of a delay volume of the accumulator pump head and a delay volume of the primary pump head.

15. A gradient system that mixes at least two fluids comprising: a pumping actuator; a pump head coupled to the pumping actuator, the pump head comprising: a monolithic pump head body; and a single mixing chamber in the pump head body extending in a longitudinal direction from a region of the mixing chamber in communication with an inlet formed in a pump head extension that extends from the pump head body to a mixing chamber extension that extends a region of the mixing chamber and is in communication with an outlet formed in the pump head body, the gradient system further comprising: a piston controlled by the pumping actuator, the piston having a plunger and extending through at least a portion of the mixing chamber, the plunger constructed and arranged to move along the common longitudinal axis, and wherein the mixing chamber and the mixing chamber extension have a uniform circumference along the length of the mixing chamber and the mixing chamber extension extending along the common longitudinal axis: and a controller that moves a position of the piston plunger to an adjustable starting location in the mixing chamber so that the plunger does not move beyond the starting location unless a change in the starting location is made by the controller, wherein the piston has an adjustable stroke length that changes a volume of the mixing chamber, wherein a delay volume is determined according to the starting location of the piston plunger in the mixing chamber, wherein at least two fluids are mixed in the determined delay volume, and wherein the mixed fluid exhibits a compositional noise level that is less than a noise level of a first volume of the mixing chamber.

16. The gradient system of claim 15, wherein the pump head is at least one of a primary pump head and an accumulator pump head, and wherein the pumping actuator is at least one of a primary pump actuator and an accumulator pump actuator.

17. The gradient system of claim 16, wherein the compositional noise level is a function of at least one of a delay volume of the accumulator pump head and a delay volume of the primary pump head.

18. A method for mixing at least two fluids in a gradient system, the method comprising: providing a single mixing chamber in a monolithic pump head of the gradient system, the mixing chamber having a first delay volume configured to mix at least two fluids, a noise level threshold established that corresponds to the first delay volume; tuning the mixing chamber to have a second delay volume by providing a pump head extension having a mixing chamber extension therein, the mixing chamber extension extending along a common longitudinal axis with the mixing chamber, the longitudinal axis extending from a region of the mixing chamber extension in communication with an inlet extending to the mixing chamber extension through the pump head extension to a region of the mixing chamber in communication with an outlet extending through the monolithic pump head, the mixing chamber extension having an outermost end on the common longitudinal axis; and mixing the at least two fluids in the second delay volume, wherein the mixed fluid in the second delay volume exhibits a compositional noise level that is less than the noise level threshold for the first delay volume, and wherein the mixing chamber and the mixing chamber extension have a uniform circumference along the length of the mixing chamber and the mixing chamber extension extending along the common longitudinal axis.

19. The method of claim 18, wherein the mixing chamber is in at least one of a primary pump head and an accumulator pump head, and wherein the compositional noise level is a function of at least one of a delay volume of the accumulator pump head and a delay volume of the primary pump head.

* * * * *